W. A. SMITH.
NUT LOCK.
APPLICATION FILED FEB. 6, 1908.

899,630.

Patented Sept. 29, 1908.
2 SHEETS—SHEET 1.

Witnesses
C. E. Hunt
C. H. Gresbauer

Inventor
W. A. Smith
By H. B. Willson & Co.
Attorneys

W. A. SMITH.
NUT LOCK.
APPLICATION FILED FEB. 6, 1908.
899,630.
Patented Sept. 29, 1908.
2 SHEETS—SHEET 2.
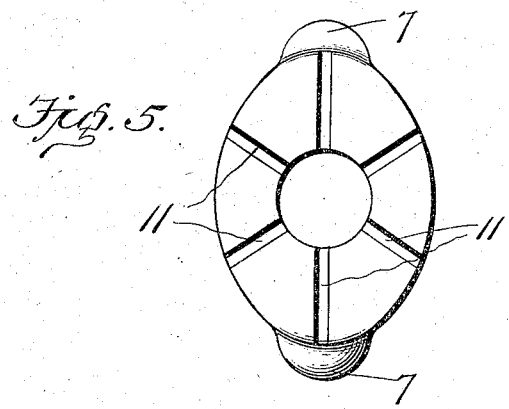
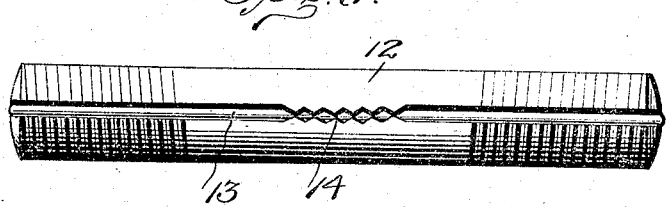
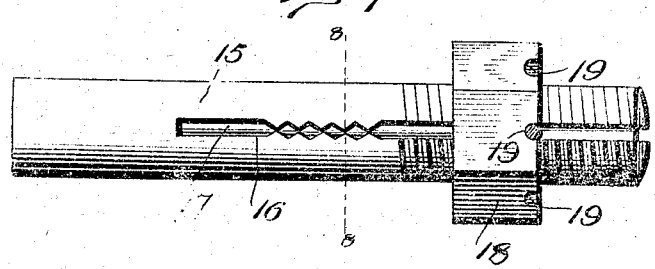
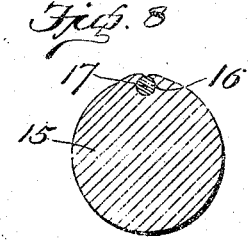
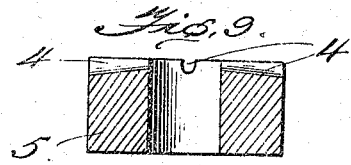
Witnesses
C. E. Hunt.
C. H. Griesbauer
Inventor
W. A. Smith
By D. H. B. Wilson &Co.
Attorneys

UNITED STATES PATENT OFFICE.

WILLIAM ANDREW SMITH, OF UNION, SOUTH CAROLINA, ASSIGNOR OF ONE-HALF TO SAMUEL JACKSON HARRIS, OF UNION, SOUTH CAROLINA.

NUT-LOCK.

No. 899,630.  Specification of Letters Patent.  Patented Sept. 29, 1908.

Application filed February 6, 1908. Serial No. 414,640.

*To all whom it may concern:*

Be it known that I, WILLIAM ANDREW SMITH, a citizen of the United States, residing at Union, in the county of Union and State of South Carolina, have invented certain new and useful Improvements in Nut-Locks; and I do declare the following to be a full, clear, and exact description of the invention, such as will enable others skilled in the art to which it appertains to make and use the same.

This invention relates to an improved nut lock.

The object of the invention is to provide simple and efficient means for locking a nut to a bolt.

Figure 1:
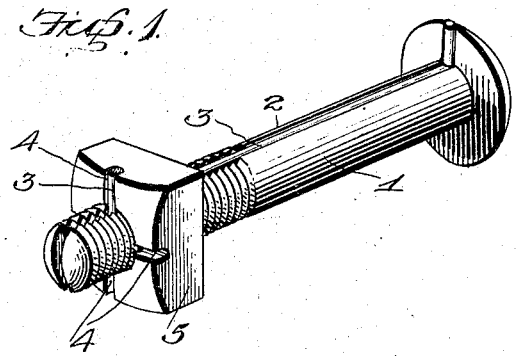
Figure 2:
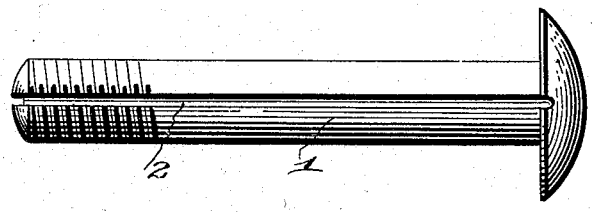
Figure 3:
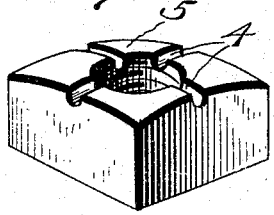
Figure 4:
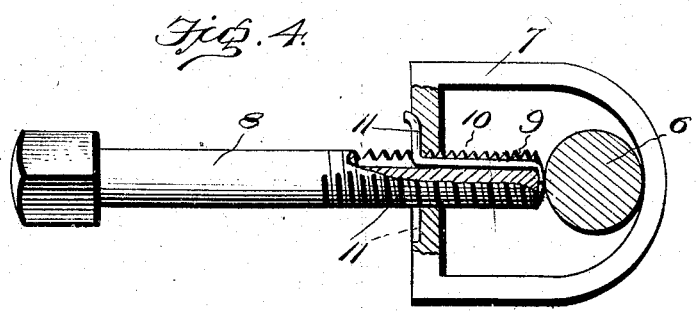

In the accompanying drawings: Figure 1 represents a perspective view of a bolt with a nut locked thereon by this improved nut lock. Fig. 2 is a side elevation of the bolt. Fig. 3 is a perspective view of the nut. Fig. 4 is a side elevation showing a slightly modified form of nut lock. Fig. 5 is a plan view of the collar shown in Fig. 4. Fig. 6 is a side elevation of the modified form of the invention, showing a shaft screw-threaded at both ends. Fig. 7 is a similar view of a headless bolt constructed in accordance with this invention. Fig. 8 is a cross section taken on line 8—8 of Fig. 7. Fig. 9 is a vertical sectional view through the nut.

In the embodiment illustrated, a bolt 1 of ordinary construction is shown, having a groove 2 of any desired shape in cross section, extending longitudinally thereof from one end to the other. Disposed in this groove is a wire 3, which extends the full length of the groove and has one end adapted to project beyond the end of the bolt and to be bent backwards at right angles to engage a groove 4 in the outer face of the nut 5, as shown. The wire may also be of any desired shape in cross section, either round or angular, and it preferably conforms to the shape of the groove in which it is to be used. When this wire is bent backwards and embedded in one of the grooves, as 4, in the nut, it will be impossible for the nut to turn in either direction. As shown, the nut 5 is provided with a plurality of grooves, as 4, which are made deeper at the outer edge to provide for the wire being more completely buried at that point and consequently more securely held. The groove 2 in the bolt 1 preferably extends across one end thereof to receive one end of the wire 3 which lies in said groove out of the way and is ready for use to form a locking means for the nut when a flush fit occurs with the nut at the end of the bolt and across the under face of its head, as shown in Figs. 1 and 2; and the wire is preferably clenched in the groove at any desired point, preferably under the head of the bolt.

In the modification shown in Fig. 4, a shaft 6 is shown with a collar 7 extending therearound and having a set screw 8 operable through said collar and bearing on said shaft 6. This screw is provided with a longitudinal groove 9, which extends across the screw-threaded end thereof and in which is arranged a wire 10, the inner end of which is adapted to fit in one of the grooves 11 in the outer face of the collar 7 to lock the collar against turning on the screw. The wire is preferably fastened in the groove at some point, to prevent its accidental separation therefrom and its consequent loss.

In the form shown in Fig. 6, a shaft 12 is screw-threaded at both ends and provided with a groove extending longitudinally from end to end, and preferably across each end thereof. A wire 13 is embedded in the shaft and is preferably clenched at the center thereof, as shown at 14. This bolt or shaft is adapted for use with two nuts, which are fastened in place by a single wire.

In Fig. 7 a headless bolt 15 is shown, having a groove 16 extending beyond the threads and in which a wire 17 is clenched. A nut 18 is shown mounted on this bolt and having a plurality of radially extending grooves 19 in its outer face, in which the free end of the wire 17 is adapted to be bent for locking the bolt in adjusted position.

Having thus described my invention, what I claim is new and desire to secure by Letters Patent, is:—

1. In a nut lock the combination with a bolt having a groove extending longitudinally thereof and transversely across the end of the screw-threaded portion; a nut having a groove extending transversely across one face thereof and a wire disposed in said longitudinal groove and normally lying in said grooved end and adapted to be bent to lie in the groove of said nut to lock said nut against turning.

2. The combination of a member screw threaded at one end and having a groove extending longitudinally thereof and continuing across its screw threaded end, a wire arranged in said longitudinal groove and in said grooved end and a member operable on said grooved member and having a groove in one face for engagement by said wire.

In testimony whereof I have hereunto set my hand in presence of two subscribing witnesses.

WILLIAM ANDREW SMITH.

Witnesses:
T. J. VINSON,
D. A. TOWNSEND.